United States Patent [19]

Yoshida

[11] 4,448,211
[45] May 15, 1984

[54] THREE-WAY VALVE
[75] Inventor: Syoichi Yoshida, Fuji, Japan
[73] Assignee: Tokyo Shibaura Denki Kabushiki Kaisha, Kawasaki, Japan
[21] Appl. No.: 326,205
[22] Filed: Dec. 1, 1981
[51] Int. Cl.³ .............................................. F16K 11/06
[52] U.S. Cl. .................................. 137/112; 62/324.6; 137/106
[58] Field of Search ....................... 137/112, 113, 106; 62/324.6; 91/420

[56] References Cited
U.S. PATENT DOCUMENTS 1,574,103 2/1926 Michael ............................ 91/420 X
2,286,873 6/1942 Schwartz .......................... 91/420 X
4,343,601 8/1982 Thorson .......................... 137/112 X

FOREIGN PATENT DOCUMENTS 2262036 7/1974 Fed. Rep. of Germany ...... 137/112
49-43857 4/1974 Japan .
815622 7/1959 United Kingdom ................ 137/106

Primary Examiner—Robert G. Nilson
Attorney, Agent, or Firm—Cushman, Darby & Cushman

[57] ABSTRACT

A three-way valve comprises a control mechanism which is disposed within a valve main body. The control mechanism is provided for bringing a first main valve in contact with a first valve seat of the valve main body and simultaneously separating a second main valve by a great distance from a second valve seat of the valve main body when the pressure of a first valve chamber is higher than a pressure of a second valve chamber, thereby communicating a second inlet port with an outlet port. Otherwise, the control mechanism is provided for bringing a second main valve in contact with the second valve seat and simultaneously separating the first main valve by a great distance from the first valve seat when the pressure of the second valve chamber is higher than the pressure of the first valve chamber, thereby communicating a first inlet port with the outlet port.

7 Claims, 11 Drawing Figures

THREE-WAY VALVE

BACKGROUND OF THE INVENTION

The present invention relates to a three-way valve for switching a pipe circuit and, more particularly, to a three-way valve for switching refrigerant flow of a heat pump type refrigeration cycle.

In heat pump type air conditioners, a four-way valve is generally used for switching cooling and heating operations. The flow of refrigerant is changed by this four-way valve. However, a conventional four-way valve has a complex structure and is expensive. Further, gas leakage from a high pressure side to a low pressure side and heat leakage from a high temperature side to a low temperature side cannot be prevented. For example, heat loss is about 150 kcal/hour, degrading the performance.

Figure 1:
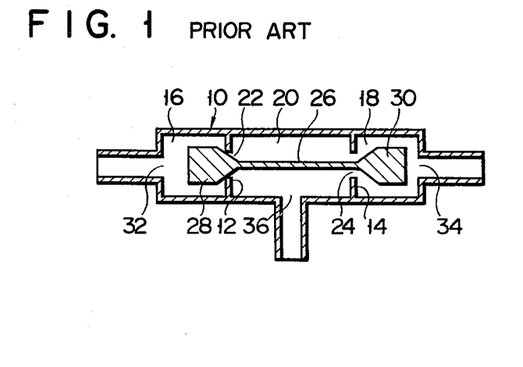
FIG. 1 is a sectional view of a conventional three-way valve.
Figure 2:
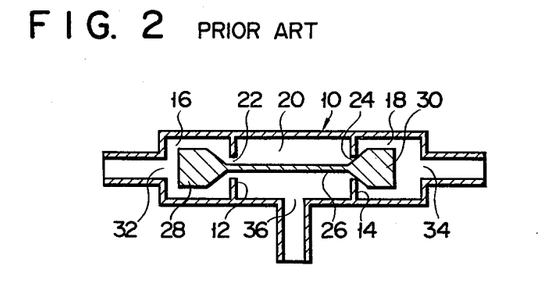
FIG. 2 is a sectional view of the three-way valve illustrating a different mode of operation shown in FIG. 1.

Recently, a three-way valve 10 as shown in FIGS. 1 and 2 has been proposed for the heat pump type refrigeration cycle. The three-way valve 10 has left and right chambers 16 and 18 and a central chamber 20 which are partitioned by two partition walls 12, 14. First and second communicating holes 22 and 24 are formed in the partition walls 12 and 14, respectively. A connecting rod 26 is slidably extended through the first and second communicating holes 22 and 24. Needle valves 28 and 30 which are disposed in the left and right chambers 16 and 18 are connected to the ends of the connecting rod 26, respectively. Openings 32, 34 and 36 are formed in the chambers 16, 18 and 20, respectively. The first opening 32 which is formed in the left chamber 16 is connected to an outlet port of a compressor through a first electromagnetic valve and to an outdoor heat exchanger. The second opening 34 which is formed in the right chamber is connected to the outlet port of the compressor through a second electromagnetic valve and an indoor heat exchanger. The third opening 36 which is formed in the central chamber 20 is connected to an inlet port of the compressor.

As shown in FIG. 1, when the needle valve 28 closes the first communicating hole 22, the needle valve 30 opens the second communicating hole 24. When the needle valve 30 closes the second communicating hole 24, the needle valve 28 opens the first communicating hole 22, as shown in FIG. 2.

When the first electromagnetic valve is opened and the second electromagnetic valve is closed, the refrigerant flows through the right chamber 18 and central chamber 20 as shown in FIG. 1. Then, when the first electromagnetic valve is closed and the second electromagnetic valve is opened, the refrigerant with high pressure in the left chamber 16 flows through the outdoor heat exchanger and indoor heat exchanger, and the right chamber 18 and central chamber 20. Therefore, the pressure of the refrigerant in the left chamber 16 is reduced to be lower than that of the refrigerant in the right chamber 18. So, the needle valve 30 is moved to narrow the second communicating hole 24 by the pressure difference. That is to say, the needle valve 28 is moved to open the first communicating hole 22. Furthermore, the needle valve 30 is moved to close the second communicating hole 24 by the fast flow of the refrigerant passing through the narrowing gap between the needle valve 30 and the second communicating hole 24. Therefore, as shown in FIG. 2, the second communicating hole 24 is closed. At this moment, the other needle valve 28 opens the first communicating hole 22.

The refrigerant flows in a loop composed of the compressor, the second electromagnetic valve, the indoor heat exchanger, a capillary tube, the outdoor heat exchanger, the left chamber 16, the central chamber 20 and then the compressor.

When the other needle valve 30 closes the second communicating hole 24, the needle valve 28 and the first communicating hole 22 preferably have only little clearance. Because, when the first electromagnetic valve is released, the movement of the needle valve 28 must be minimized so that leakage of the refrigerant through the clearance is also minimized. It is noted that the needle valve 28 and the other needle valve 30 are connected through the rigid connecting rod 26. When the needle valve 28 is biased by the differential pressure and the first communicating hole 22 is sealed, the other needle valve 30 and the second communicating hole 24 are slightly separated. The refrigerant passing through this clearance has a pressure loss. This pressure loss results in significant lessening of heating/cooling performance.

When the clearance between the other needle valve 30 and the second communicating hole 24 is made wide, the gap between the needle valve 28 and the first communicating hole 22 becomes wide accordingly. This may cause an increase in leakage of the refrigerant, as described above, entailing undesirable results. In this manner, the three-way valves which have been hitherto proposed have simple construction but do not solve the above problems.

SUMMARY OF THE INVENTION

The present invention has been made in consideration of the above mentioned circumstances and has for its object to provide a three-way valve in which leakage of refrigerant is minimized and pressure loss is prevented.

According to one aspect of the present invention there is provided a three-way valve comprising:

a valve main body having a first valve chamber one end of which is provided with a first inlet port, a second valve chamber the other end of which is provided with a second inlet port, and a communicating path which is disposed between said first valve chamber and said second valve chamber to communicate therewith through a first valve seat and a second valve seat and which is provided with an outlet port;

a first main valve which is disposed within the first valve chamber and which may be selectively in contact with and detach from the first valve seat;

a second main valve which is disposed within the second valve chamber and which may be selectively in contact with and detach from the second valve seat; and control means, which is disposed within the valve main body, for bringing the first main valve in contact with the first valve seat and simultaneously separating the second main valve by a great distance from the second seat when the pressure of the first valve chamber is higher than a pressure of the second valve chamber, thereby communicating the second inlet port with the outlet port, and for bringing the second main valve in contact with the second valve seat and simultaneously separating the first main valve by a great distance from the first seat when the pressure of the second valve chamber is higher than the pressure of the first valve chamber, thereby communicating the first inlet port with the outlet port.

DETAILED DESCRIPTION OF THE PREFERRED EMBODIMENTS

The first embodiment of a three-way valve according to the present invention will be described in detail with reference to FIGS. 3 to 7.

Figure 3:
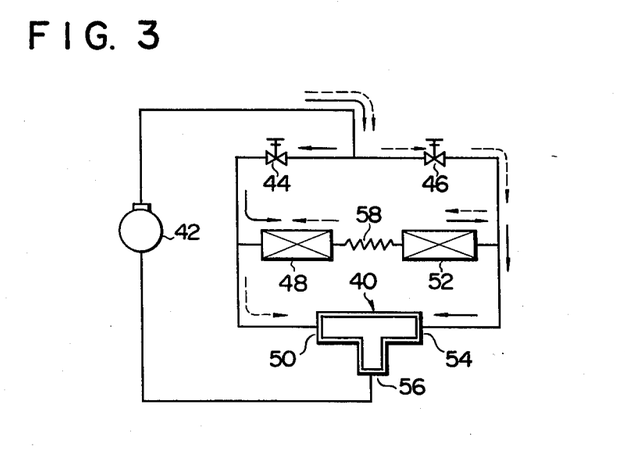
FIG. 3 is a view schematically illustrating a system of a heat pump type air conditioner which employs a first embodiment of a three-way valve according to the present invention.

FIG. 3 is a view schematically illustrating a system of a heat pump type air conditioner which employs the first embodiment of a three-way valve according to the present invention. An outlet port of a compressor 42 in the system is connected to inlet ports of first and second electromagnetic valves 44 and 46. An outlet port of the first electromagnetic valve 44 is connected to one port of an indoor heat exchanger 48 and to a first inlet port 50 of a three-way valve 40. An outlet port of the second electromagnetic valve 46 is connected to one port of an outdoor heat exchanger 52 and to a second inlet port 54 of the three-way valve 40. An outlet port 56 of the three-way valve 40 is connected to an inlet port of the compressor 42. The other port of the indoor heat exchanger 48 and the other port of the outdoor heat exchanger 52 are connected to each other through a capillary 58.

In the system with the above structure, the first electromagnetic valve 44 is released and the second electromagnetic valve 46 is shut when heating is performed. In this condition, when the compressor 42 starts operating, refrigerant flows in the direction shown by the solid arrows. The refrigerant reaches the first inlet port 50 of the three-way valve and the indoor heat exchanger 48 through the first electromagnetic valve 44. When the refrigerant reaches the first inlet port 50, the pressure of the refrigerant seals between the first inlet port 50 and the outlet port 56 so that the refrigerant flows from the second inlet port 54 to the outlet port 56. Therefore, the refrigerant flowing through the indoor heat exchanger 48 subsequently flows in a loop of the indoor heat exchanger 48, the capillary 58, the outdoor heat exchanger 52, the three-way valve 40 and the compressor 42.

During the cooling operation, the first electromagnetic valve 44 is shut and the second electromagnetic valve 46 is released. When the compressor 42 starts operating under this condition, the refrigerant flows along the broken arrows. The refrigerant thus reaches the outdoor heat exchanger 52 and the second inlet port 54 of the three-way valve 40 through the second electromagnetic valve 46. When the refrigerant reaches the second inlet port 54, the pressure of the refrigerant seals between the second inlet port 54 and the outlet port 56 so that the refrigerant flows from the first inlet port 50 to the outlet port 56. Therefore, the refrigerant flowing through the outdoor heat exchanger 52 subsequently flows in a loop of the outdoor heat exchanger 52, the capillary 58, the indoor heat exchanger 48, the three-way valve 40, and the compressor 42.

The three-way valve 40 which is employed for the system with the above arrangement will be described below.

Figure 4:
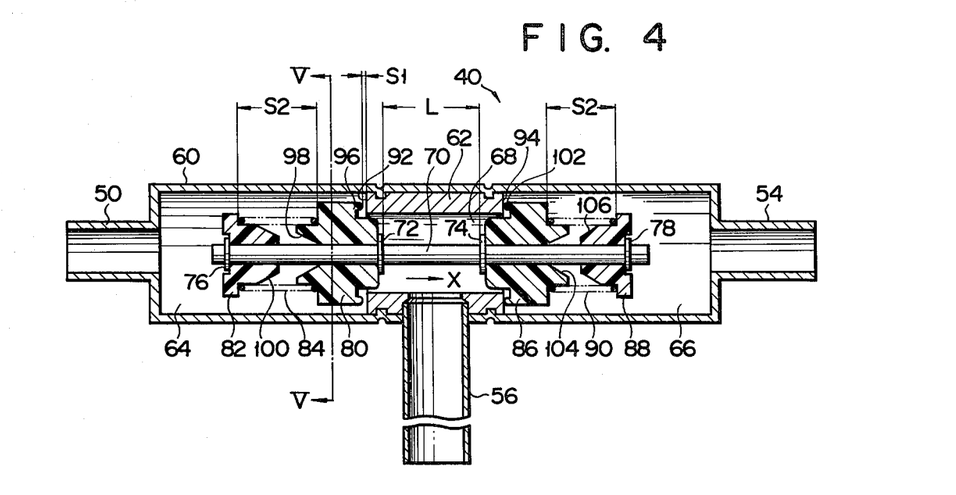
FIG. 4 is a detailed sectional view of the three-way valve shown in FIG. 3.

Referring to FIG. 4, the three-way valve 40 has a hollow cylindrical valve main body 60 both ends of which are open. The first inlet port 50 is formed at one opening of the valve main body 60, while the second inlet port 54 is formed at the other opening of the valve main body 60. An annular partition wall 62 which is formed on the inner wall of the central segment of the valve main body 60 extends a predetermined length along the central axis of the valve main body 60. The inner space of the valve main body 60 is constituted by a first valve chamber 64 which is defined between the partition wall 62 and the first inlet port 50, a second valve chamber 66 which is defined between the partition wall 62 and the second inlet port 54, and a communicating path 68 which is defined by the inner surface of the partition wall 62.

The outlet port 56 described above is mounted on the outer surface at the central segment of the valve main body 60. The outlet port 56 communicates with the communicating path 68 through the partition wall 62. The first inlet port 50 communicates with the first valve chamber 64, and the second inlet port 54 communicates with the second valve chamber 66.

A shaft 70 which is free to move in the axial direction thereof is disposed within the valve main body 60. Both ends of the shaft 70 respectively extend into the first valve chamber 64 and the second valve chamber 66. A pair of first and second stoppers 72 and 74 which are spaced apart at a distance L are mounted at the central segment of the shaft 70. Further, a pair of third and fourth stoppers 76 and 78 are fixed at both ends of the shaft 70. A first main valve 80 which may come in contact with the first stopper 72 is coaxially mounted at a segment between the first stopper 72 and the third stopper 76 on the shaft 70. A first pilot valve 82 as one of the constituting elements of the control means, which may come in contact of the third stopper 76 is coaxially mounted at the segment described above. The first main valve 80 is provided with a through hole at the center thereof and the first pilot valve 82 is provided with the other through hole at the center thereof. Each through hole extends in the axial direction of the first main valve 80 or the first pilot valve 82. The common shaft 70 is inserted through the through holes. The first main valve 80 and the first pilot valve 82 are slidable in the axial direction of the shaft 70. A first spring 84 is arranged as one of the constituting elements of the control means between the first main valve 80 and the first pilot valve 82. The first spring 84 urges the first main valve 80 to the first stopper 72, and the first pilot valve 82 to the third stopper 76.

On the other hand, a second main valve 86 which may come in contact with the second stopper 74 is coaxially mounted at a segment between the second stopper 74 and the fourth stopper 78 on the shaft 70. A second pilot valve 88 as one of the constituting elements of the control means, which may be in contact with the fourth stopper 78 is coaxially mounted at the segment described above. The second main valve 86 is provided with a through hole at the center thereof and the second pilot valve 88 is provided with the other through hole at the center thereof. Each through hole extends in the axial direction of the second main valve 86 or the second pilot valve 88. The common shaft 70 is inserted through the through holes. The second main valve 86 and the second pilot valve 88 are slidable in the axial direction of the shaft 70. A second spring 90 is arranged as one of the constituting elements of the control means between the second main valve 86 and the second pilot valve 88. The second spring 90 urges the second main valve 86 to the second stopper 74, and the second pilot valve 88 to the third stopper 76, respectively.

Figure 5:
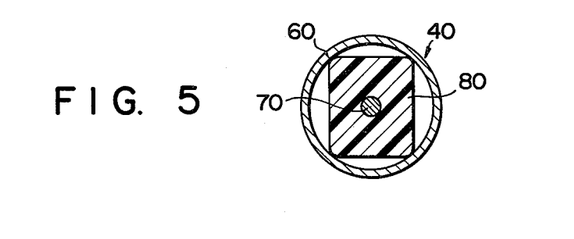
FIG. 5 is a sectional view along the line V—V of FIG. 4.

The first and second main valves 80 and 86 have the same arrangement. Referring to FIG. 5, the section of the first and second main valves 80 and 86 is of rectangular shape. Side edges of the first and second main valves 80 and 86 are respectively rounded and are in contact with the inner circumferential surface of the valve main body 60. Therefore, the central axis of the shaft 70 and the central axis of the valve main body 60 coincide, and the first and second main valves 80 and 86 are slidable in the axial direction within the valve main body 60. Both end faces of the partition wall 62 define first and second valve seats 92 and 94, respectively.

A first annular contact segment 96 of ridge shape is disposed at that part of the first main valve 80 which is opposing the first valve seat 92. A first auxiliary valve seat 98 which is constituted by a recess of substantially conical shape is disposed at that part of the first main valve 80 which is opposing the first pilot valve 82. On the other hand, a first auxiliary contact segment 100 which may come in contact with the first auxiliary valve seat 98 and which is constituted by a projection of substantially conical shape is disposed at that part of the first pilot valve 82 which is opposing the first auxiliary valve seat 98.

The second main valve 86 has the same construction as the first main valve 80. A second annular contact segment 102 of ridge shape is disposed at that part of the second main valve 86 which is opposing the second valve seat 94. A second auxiliary valve seat 104 which is constituted by a recess of substantially conical shape is disposed at that part of the second main valve 86 which is opposing the second pilot valve 88. On the other hand, a second auxiliary contact segment 106 which may come in contact with the second auxiliary valve seat 104 and which is constituted by a projection of substantially conical shape is disposed at that part of the second pilot valve 88 which is opposing the second auxiliary valve seat 104.

In the three-way valve 40 with the above arrangement, the positional relation is maintained as follows.

In a condition in which the pressurized refrigerant reaches neither the first inlet port 50 nor the second inlet port 54, as shown in FIG. 4, when the first main valve 80 is in contact with the first stopper 72 and the second main valve 86 is in contact with the second stopper 74, the first and second stoppers 72 and 74 are so set at a distance L that a distance between the distal end of the first contact segment 96 of the first main valve 80 and the distal end of the second contact segment 102 of the second main valve 86 is set to become longer than the length of the partition wall 62 by a short distance S1. In other words, in the condition described above, when the first contact segment 96 of the first main valve 90 comes in contact with the first valve seat 92, the second contact segment 102 and the second valve seat 94 of the second main valve 86 are spaced apart by the distance S1. In contrast, when the second contact segment 102 of the second main valve 86 comes in contact with the second valve seat 94, the first contact segment 96 and the first valve seat 92 of the first main valve 80 are spaced apart by the distance S1.

A distance between the first stopper 72 and the third stopper 76 is the same as a distance between the second stopper 74 and the fourth stopper 78. Further, the distance between the first stopper 72 and the third stopper 76 is set so that the first main valve 80 is spaced apart from the first pilot valve 82 by a distance S2 when the first main valve 80 is in contact with the first stopper 72 and the first pilot valve 82 is in contact with the third stopper. Similarly, the distance between the second stopper 74 and the fourth stopper 78 is set so that the second main valve 86 is spaced apart from the second pilot valve 88 by the distance S2 when the second main valve 86 is in contact with the second stopper 74 and the second pilot valve 88 is in contact with the fourth stopper 78.

Figure 7:
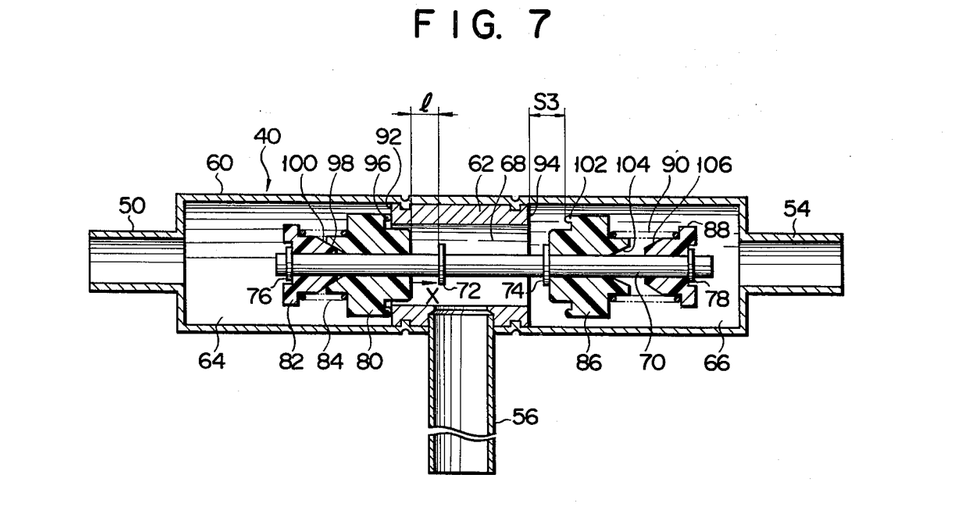
FIG. 7 is a sectional view of the three-way valve in a further different mode of operation shown in FIG. 6.

Referring to FIG. 7, the first main valve 80 is free to move only by a distance l against the urging force of the first spring 84 from a position in which the first main valve 80 is in contact with the first stopper 72 to a position in which the first main valve 80 comes in contact with the first pilot valve 82. The distance l is set to be considerably longer than the distance S1. Although not shown, the second main valve 86 is free to move only by the distance l from a position in which the second main valve 86 is in contact with the second stopper 74 to a position in which the second main valve 86 comes in contact with the second pilot valve 88 in the same manner as described in the first main valve 80.

The mode of operation of the three-way valve 40 with the above structure will be described.

In the cooling operation described above, the pressurized refrigerant flows into the first valve chamber 64 through the first inlet port 50 in the condition shown in FIG. 4. Then, when the heating operation is initiated, the first electromagnetic valve 44 is released and the second electromagnetic valve 46 is shut. So, the refrigerant with high pressure in the second valve chamber flows via the outdoor heat exchanger 52, capillary 58, indoor heat exchanger 48 and first inlet port 50, into the communicating path 68 through the gap between the first contact segment 96 of the first main valve 80 and the first valve seat 92 of the partition wall 62. Therefore, the pressure of the refrigerant in the second valve chamber 66 is reduced to be lower than that of the refrigerant in the first valve chamber 64. Thus, the shaft 70, first main valve 80 and first pilot valve 82 are integrally moved to narrow the gap between the first contact segment 96 and the first valve seat 92. Furthermore, the first contact segment 96 is moved to contact with the first valve seat 92 by the fast flow of the refrigerant passing through the narrowing gap. As a result, the first main valve 80 moves by the distance S1 in the direction of arrow X by the pressure difference. The first contact segment 96 of the first main valve 80 comes in contact with the first valve seat 92 and the first contact segment 96 is brought to the position shown in FIG. 6. Since the distance S1 for which the first main valve 80 moves is very small, a short period of time is required for displacement from the position shown in FIG. 4 to the position shown in FIG. 6 so that leakage of the refrigerant is very small. In the position shown in FIG. 6, the first main valve 80 closes the opening on the side of the first inlet port 50 of the communicating path 68 and the second main valve 86 is spaced apart from the second valve chamber 66 by the distance S1. Therefore, the communicating path 68 and the second valve chamber 66 are connected through this distance S1.

Figure 6:
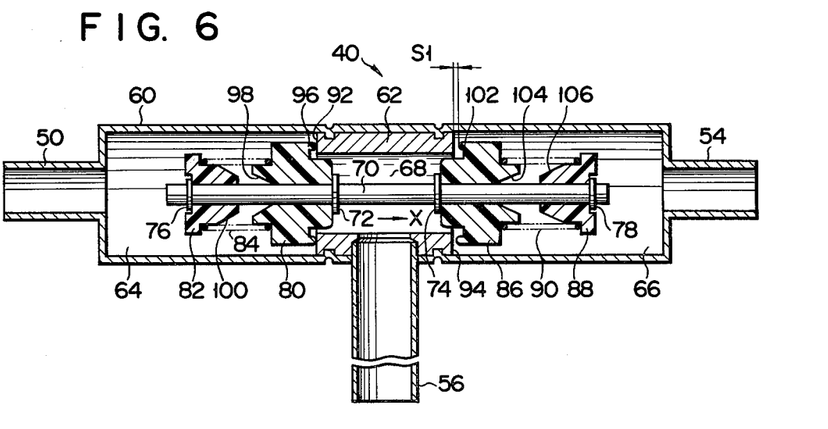
FIG. 6 is a sectional view of the three-way valve in a different mode of operation shown in FIG. 4.

In the position shown in FIG. 6, the first contact segment 96 of the first main valve 80 is pressed to the first valve seat 92 so that the refrigerant filled within the first valve chamber 64 is further pressurized. Therefore, that portion of the shaft 70 which extends within the first valve chamber 64 is further moved by the increased pressure of the refrigerant in the direction shown by the arrow X against the urging force of the first spring 84. As shown in FIG. 7, in response to the movement of the shaft 70, the first auxiliary contact segment 100 of the first pilot valve 82 is brought in contact with the first auxiliary valve seat 98 of the first main valve 80 through the third stopper 76, interrupting the movement of the shaft 70. In this position, the second main valve 86 is spaced apart from the second valve seat 94 by a distance S3. The distance S3 is given by the following relation as apparent from the above description:

$$S3 = S1 + 1$$

The distance S3 is greater than the distance S1 and is set to be greater than that of the conventional device so that the pressure loss of the refrigerant caused thereby passing through a gap formed by the distance S3 is greatly reduced as compared with the conventional case. The refrigerant flows well into the outlet port 56 through the second inlet port 54, the second valve chamber 66, and the communicating path 68. Therefore, since the first auxiliary contact segment 100 of the first pilot valve 82 is in tight contact with the first auxiliary seat 98 of the first main valve 80, leakage of the refrigerant through a tiny gap between the shaft 70 and the first main valve 80 is completely prevented. This tiny gap is necessary for sliding the first main valve 80 relative to the shaft 70.

In this condition, when the heating operation is interrupted, the compressor 42 stops compressing the refrigerant. Therefore, the pressure difference between the refrigerant within the first valve chamber 64 and the refrigerant within the second valve chamber 66 is abruptly reduced. The first pilot valve 82 moves in a direction opposite to the direction shown by the arrow X by the urging force of the first spring 84 as shown in FIG. 7. In this manner, the first pilot valve 82 restores the position shown in FIG. 6. That is, the distance between the second main valve 86 and the valve seat 94 is reduced from the distance S3 to the distance S1.

In this condition, when the cooling operating is initiated, the first electromagnetic valve 44 is closed and the second electromagnetic valve 46 is opened. The subsequent operation is performed in the manner opposite to the heating operation and the description thereof will therefore be omitted.

The present invention is not limited to the first embodiment described above. Various changes and modifications may be made within the spirit and scope of the present invention.

In the first embodiment described above, when the cross section of the valves 80 and 86 is made in rectangular shape and four edges of the main valves 80 and 86 are in contact with the inner surface of the valve main body 60, the shaft 70 is slidably supported in the valve main body 60. However, the present invention is not limited to the structure described above. The shaft 70 may be supported by a proper supporting means, for example, front ends of two pairs of supporting arms each consisting of three arms which extend toward the shaft 70 from the inner surface of the valve main body 60.

Another embodiment of the three-way valve according to the present invention will be described below. The same reference numerals in the first embodiment denote the same parts in the embodiment described below and the detailed description thereof will be omitted.

Figure 8:
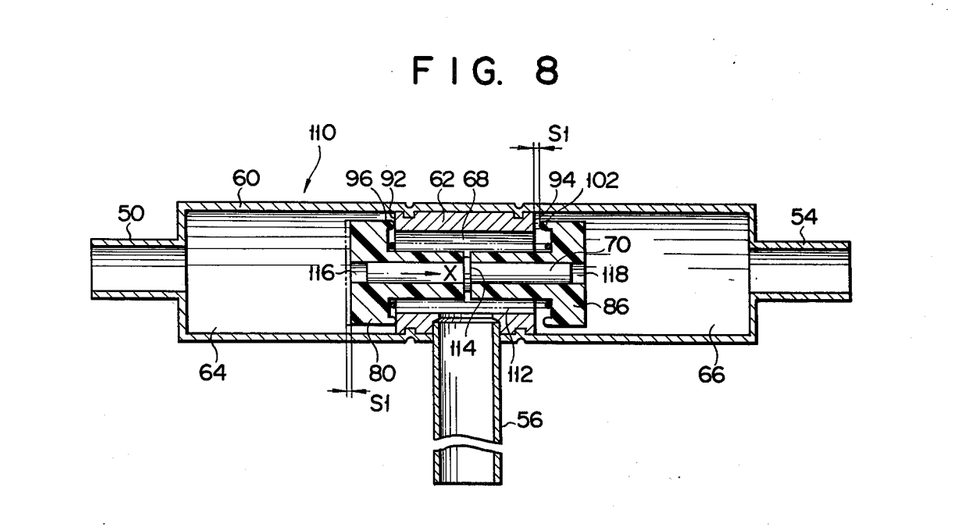
FIG. 8 is a sectional view of a second embodiment of a three-way valve according to the present invention.
Figure 9:
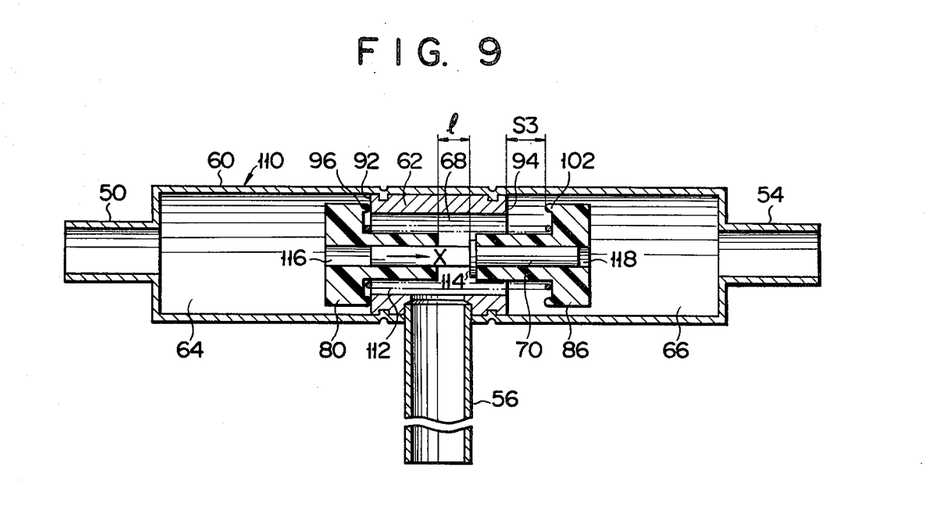
FIG. 9 is a sectional view of the three-way valve in a different mode of operation shown in FIG. 8.

A three-way valve 110 of the second embodiment according to the present invention is shown in FIGS. 8 and 9. In the second embodiment, the first and second main valves 80 and 86 are slidably mounted at both ends of the shaft 70. The first and second main valves 80 and 86 are biased by a tension spring 112 in a direction to come close to each other. The shaft 70 disposed between the first and second main valves 80 and 86 is provided with a common stopper 114. In this manner, the control means is constituted. The length of the shaft 70 is determined so that the first end face of the shaft 70 at the side of the first inlet port 50 is present within a first central through hole 116 of the first main valve 80, while the second end face of the shaft 70 at the side of the second inlet port 52 is present within a second central through hole 118 of the second main valve 86. The length of the partition wall 62 and the size of the first and second main valves 80 and 86 are determined so that either the distance between the first valve seat 92 and the first contact segment 96 or the distance between the second valve seat 94 and the second contact segment 102 is set to be the distance S1.

In a heat pump type air conditioner using the three-way valve 110 with the structure above, when the heating operation is initiated as described in the first embodiment, the first valve chamber 64 is filled with the pressurized refrigerant. Therefore, as shown by a dot and dash line in FIG. 8, even if a gap between the first contact segment 96 of the first main valve 80 and the first valve seat 92 is formed, that is, the distance S1 between the first contact segment 96 of the first main valve 80 and the first valve seat 92 is maintained, the first main valve 80 moves in the direction shown by the arrow X by the pressure difference so that the first main valve 80 is spontaneously closed. In this manner, the condition which is shown by the solid line in FIG. 8 is achieved. In the condition shown in FIG. 8, the first end face is pressurized by the refrigerant and the shaft 70 further moves in the direction shown by the arrow X against the urging force of the common spring 112. Therefore, when the second main valve 86 engages with a common stopper 114 mounted to the shaft 70, the second main valve 86 and the shaft 70 move in the direction shown by the arrow X integrally. The distance between the second contact segment 102 of the second main valve 86 and the second valve seat 94 becomes the distance S3. In other words, pressure loss of the refrigerant flowing out from the second inlet port 54 to the outlet port 56 is greatly reduced as compared with the conventional three-way valve.

In this manner, according to the second embodiment, the same effect as in the first embodiment is obtained. Although the distance S3 is limited by an engagement of the first auxiliary contact segment 100 of the first pilot valve 82 with the first auxiliary valve seat 98 of the first main valve 80 in the first embodiment, this limit is eliminated in the second embodiment so that the distance S3 is set to be greater than that in the first embodiment.

Figure 10:
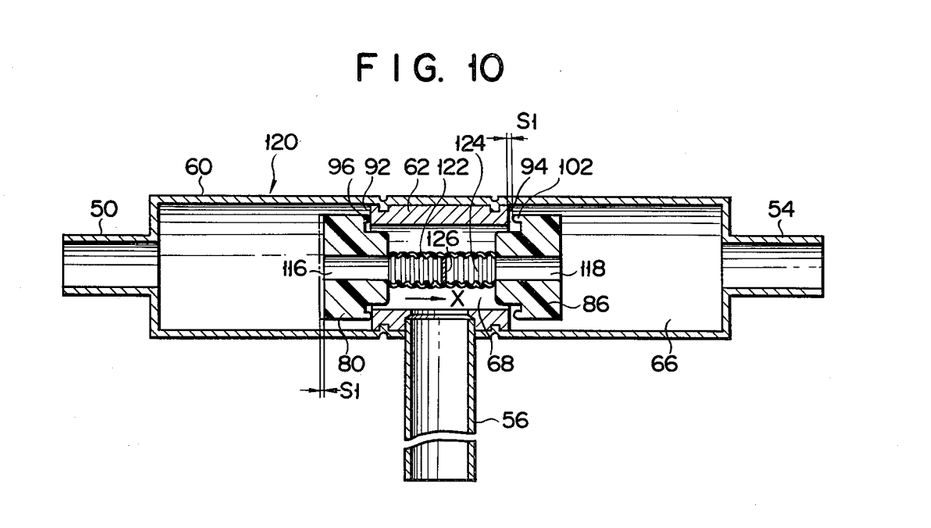
FIG. 10 is a sectional view of a third embodiment of a three-way valve according to the present invention.
Figure 11:
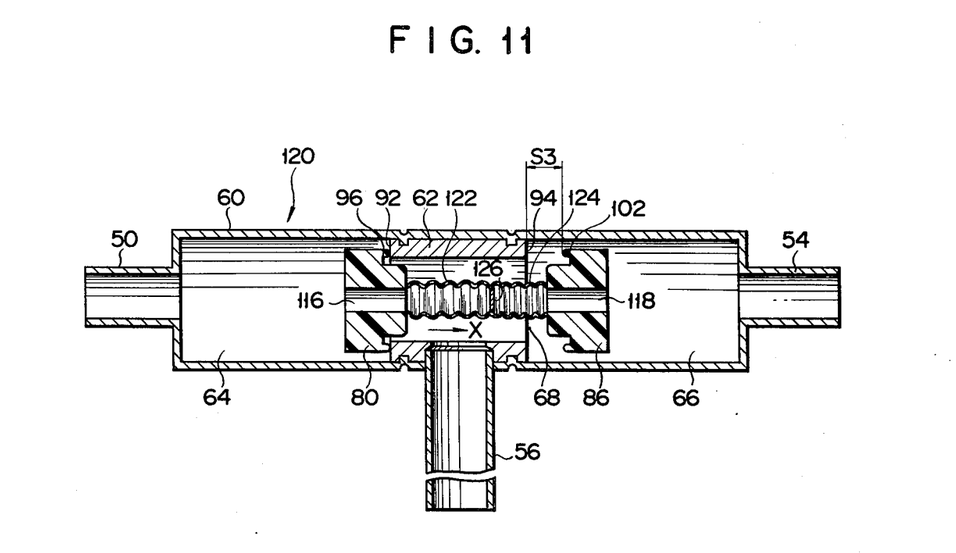
FIG. 11 is a sectional view of the three-way valve in a different mode of operation shown in FIG. 10.

The third embodiment of a three-way valve 120 according to the present invention will be shown in FIGS. 10 and 11. In the third embodiment, the first main valve 80 includes a first central through hole 116 with first and second openings at both end surfaces thereof. The first opening of the hole 116 faces the second main valve 86. A first bellows 122 as one of the constituting elements of the control means is disposed at the first opening to communicate with the inner space thereof. The first bellows 122 elastically contracts when the outer force is not imposed on the first bellows 122. When the pressurized refrigerant is filled within the first bellows 122 from the first valve chamber 64 through the first central through hole 116, the bellows 122 extends against its elastic force in the direction shown by the arrow X in the figure by a distance corresponding to the distance l indicated in the first and second embodiments. On the other hand, the second main valve 86 includes a second central through hole 118 with first and second openings at both end surfaces thereof. The first opening of the hole 118 faces the first main valve 80. The second bellows 124 as another constituting elements of the control means is disposed at the first opening of the second central through hole to communicate with the inner space thereof. The second bellows 124 elastically contracts when the outer force is not applied to the second bellows 124. When the pressurized refrigerant is filled within the second bellows 124 from the second valve chamber 66 through the second central hole 118, the second bellows 124 extends in a direction opposite to the direction shown by the arrow X in the figure by the distance l against the its elastic force.

Both ends of the first and second bellows 122 and 124 are connected to each other through a partition wall 126. The entire length of the first and second bellows 122 and 124 is determined so that either the distance between the first valve seat 92 and the first contact segment 96 or the distance between the second valve seat 94 and the second contact segment 102 is set to be the distance S1, when no outer force is applied to the bellows 122 and 124.

In a heat pump type air conditioner which adopts the three-way valve 120 with the above structure, when the heating operation is initiated as described in the first embodiment, the first valve chamber 64 is filled with the pressurized refrigerant. Therefore, as shown by a dot and dash line in FIG. 10, even if a gap between the first contact segment 96 of the first main valve 80 and the first valve seat 92 is formed, that is, the distance S1 between the first contact segment 96 of the first main valve 80 and the first valve seat 92 is maintained, the first main valve 80 moves in the direction shown by the arrow X by the pressure difference so that the first main valve 80 is spontaneously closed. In this manner, the condition which is shown by the solid line in FIG. 10 is achieved. In the condition shown in FIG. 10, when the first bellows 122 is filled with the pressurized refrigerant, the first bellows 122 extends by the distance l so that the distance between the second contact segment 102 of the second main valve 86 and the second valve seat 94 becomes the distance S3. Pressure loss of the refrigerant following from the second inlet port 54 to the outlet port 56 is greatly reduced as compared with the conventional three-way valve.

In this manner, according to the third embodiment, the same effect as in the first embodiment is obtained. The leakage of the refrigerant from the first valve chamber 64 to the communicating path 68 through the first central through hole 116 is completely prevented because the first central through hole 116 is closed by the first bellows 112.

What is claimed is:

1. A three-way valve comprising:

a valve main body having a first valve chamber, one end of which is provided with a first inlet port, a second valve chamber, one end of which is provided with a second inlet port, a path for communicating the other end of the first valve chamber with the other end of the second valve chamber, a first valve seat disposed on the other end of the first valve chamber, a second valve seat disposed on the other end of the second chamber, and an outlet port communicating with said path;

a first main valve disposed within said first valve chamber and selectively movable between a first position in which the first main valve comes into contact with the first valve seat to seal the first valve chamber, a second position in which the first main valve is separated from the first valve seat by a first distance, and a third position in which the first main valve is separated from the first valve seat by a second distance greater than the first distance;

a second main valve disposed within said second valve chamber and selectively movable between a fourth position in which the second main valve comes into contact with the second valve seat to seal the second valve chamber, a fifth position in which the second main valve is separated from the second valve seat by a third distance, and a sixth position in which the second main valve is separated from the second valve seat by a fourth distance greater than the third distance; and control means disposed within the valve main body for (a) moving the first main valve from the third position to the first position while simultaneously moving the second main valve from the fourth position to the fifth position when the pressure within the first valve chamber is greater than the pressure within the second valve chamber by a first value to thereby close the first valve chamber and establish communication between the second valve chamber and the outlet port, (b) moving the second main valve from the fifth position to the sixth position when the pressure within the first valve chamber is greater than the pressure within the second valve chamber by a second value greater than the first value to thereby separate the second main valve and the second valve seat greatly from each other, (c) moving the second main valve from the sixth position to the fourth position while simultaneously moving the first main valve from the first position to the second position when the pressure within the second valve chamber is greater than the pressure within the first valve chamber by a third value to thereby close the second valve chamber and establish communication between the first valve chamber and the outlet port; and (d) moving the first main valve from the second position to the third position when the pressure within the second valve chamber is greater than the pressure within the first valve chamber by a fourth value which is greater than the third value to thereby separate the first main valve and the first valve seat greatly from each other.

2. The three-way valve according to claim 1, wherein said first and second main valves are spaced apart from each other at a distance slightly greater than a distance between said first and second valve seats, when a pressure difference between said first and second valve chambers is substantially negligible.

3. The three-way valve according to claim 2, wherein each of said first and second main valves has a through hole along an axial direction thereof, and said control means includes:
   a shaft which is disposed within said valve main body to be movable along an axial direction thereof and which slidably supports said first and second main valves through each of said through holes;
   stop means which is mounted on the shaft between said first main valve and said second main valve and which may be in contact with said first and second main valves; and
   biasing means for biasing said first and second main valves to bring said first and second main valves in contact with said stop means, whereby said shaft moves toward the other valve chamber against the biasing force of said biasing means when a pressure of one valve chamber is higher than a pressure of said other valve chamber so that said main valve of said other valve chamber is greatly spaced apart from said valve seat thereof.

4. The three-way valve according to claim 3, wherein said stop means includes one stopper, said biasing means includes a compression spring, and said first and second main valves are respectively in contact with both ends of said stopper by a biasing force of said compression spring when a pressure difference between said first and second valve chambers is substantially zero.

5. The three-way valve according to claim 3, wherein said stop means includes a first and a second stopper which are spaced apart from each other and on which said first and second main valve abut, respectively; said control means further includes first and second pilot valves which are axially slidably mounted at both ends of said shaft and which come in contact with end faces of said shaft at the sides of said first and second inlet ports of said first and second main valves, respectively; and third and fourth stoppers which are fixed at said shaft and which prevent removal of said third and fourth stoppers from said shaft; and said biasing means has a first compression spring which biases said first main valve to a first stopper and first pilot valve to said third stopper and a second compression spring which biases said second main valve to said second stopper and said second pilot valve to said fourth stopper to achieve tight contact therebetween.

6. The three-way valve according to claim 5, wherein said pilot valve in one valve chamber moves in response to movement of said shaft toward the other valve chamber through said stopper within one valve chamber when either a pressure of said one valve chamber is higher than a pressure of said other valve chamber, and said pilot valve in one valve chamber has a contact surface which comes in contact with an end face of said main valve in said one valve chamber.

7. A three-way valve according to claim 2, wherein each of said first and second main valves has a through hole at a central axis thereof; and said control means includes a first bellows, which is disposed within said communicating path, one end of which is open to said through hole of said first main valve and the other end of which is closed, a second bellows one end of which is opened to said through hole of said second main valve and the other end of which is closed, so that one bellows is biased to contract when an outer force is not applied thereto and said one bellows expands toward the other bellows when the outer force is applied, and a partition wall to which each of the other ends of said first and second bellows is mounted, whereby said one bellows expands by the pressure of one valve chamber against the biasing force when a pressure of said one valve chamber is higher than a pressure of the other valve chamber, and said main valve of said other valve chamber is greatly spaced apart from said valve seat thereof.

* * * * *